United States Patent [19]

Hayashi et al.

[11] 4,448,323

[45] May 15, 1984

[54] SAFETY FUEL FILLER STRUCTURE OF A MOTOR VEHICLE

[75] Inventors: Isao Hayashi; Makoto Moriya, both of Yokohama, Japan

[73] Assignee: Nissan Motor Co., Ltd., Yokohama, Japan

[21] Appl. No.: 355,211

[22] Filed: Mar. 5, 1982

[30] Foreign Application Priority Data

Mar. 12, 1981 [JP] Japan ................................. 56-34508
Mar. 12, 1981 [JP] Japan ................................. 56-34509

[51] Int. Cl.³ ............................................. B65D 41/00
[52] U.S. Cl. .................................. 220/86 R; 280/5 A
[58] Field of Search ................. 220/86 R, 88 R, 85 F; 296/1 C; 280/5 A; 138/96 R

[56] References Cited

U.S. PATENT DOCUMENTS

| 99,744 | 2/1870 | Alford et al. | 285/290 |
|---|---|---|---|
| 1,485,738 | 3/1924 | Taft . | |
| 2,545,178 | 3/1951 | Vaughn | 220/86 R X |
| 3,911,977 | 10/1975 | Berger | 220/86 R X |
| 4,079,952 | 3/1978 | Nishio et al. | 220/86 R X |
| 4,142,756 | 3/1979 | Henning et al. | 220/86 R X |
| 4,171,750 | 10/1979 | Hundemer | 220/86 R |
| 4,177,931 | 12/1979 | Evans | 220/DIG. 23 X |
| 4,235,263 | 11/1980 | Lake, Jr. | 220/86 R X |
| 4,252,245 | 2/1981 | Kudo | 220/86 R X |
| 4,279,320 | 7/1981 | Brandl et al. | 220/86 R X |
| 4,284,218 | 8/1981 | Gillis et al. | 296/1 C X |
| 4,323,166 | 4/1982 | Maeroff | 220/86 R |

FOREIGN PATENT DOCUMENTS

| 498261 | 12/1953 | Canada | 220/86 R |
|---|---|---|---|
| 2657747 | 6/1978 | Fed. Rep. of Germany . | |
| 437395 | 10/1935 | United Kingdom | 220/86 R |

Primary Examiner—Allan N. Shoap
Assistant Examiner—Robert Petrik
Attorney, Agent, or Firm—Lane, Aitken & Kananen

[57] ABSTRACT

A fuel filler tube is secured to an inside constructional member of a vehicle with its fuel inlet mouth portion spacedly received in a cup-shaped member secured to a vehicle outer panel. An outwardly projected bumper member having a considerable size is mounted or formed on the fuel filler tube in the vicinity of the fuel inlet mouth of the tube. Thus, upon a vehicle collision inducing a considerable displacement of the filler tube relative to the cup-shaped member, initial collision occurs between the bumper member and the cup-shaped member thereby suppressing the collision of the filler cap with the cup-shaped member.

6 Claims, 8 Drawing Figures

SAFETY FUEL FILLER STRUCTURE OF A MOTOR VEHICLE

BACKGROUND OF THE INVENTION

The present invention relates in general to a fuel filler structure of a motor vehicle, and more particularly to a safety fuel filler structure which assures prevention of fuel leakage from a fuel filler tube even in a vehicle collision.

SUMMARY OF THE INVENTION

It is an object of the present invention to provide a safety fuel filler structure which is constructed to prevent a fuel filler cap from being removed from the fuel filler tube even in a vehicle collision.

According to the present invention, there is provided a fuel filler structure of a motor vehicle which has an outer body panel and an inside constructional member located inside of the outer body panel, the fuel filler structure comprising a cup-shaped base member secured to an open portion of the outer body panel to form a recess on the outer body panel, the base member being formed at its bottom portion with an opening; a fuel filler tube secured to the inside constructional member with its fuel inlet mouth portion freely inserted into the recess through the opening of the base member; a flexible sealing member sealingly covering the clearance defined between the filler tube and the base member; a filler cap removably connected to the mouth of the filler tube and located within the recess of the outer body panel; and a bumper means mounted on the fuel filler tube and constructed to make an initial collision with the base member when the fuel filler tube is displaced to a certain degree relative to the base member.

BRIEF DESCRIPTION OF THE DRAWINGS

Other objects and advantages of the present invention will become clear from the following description when taken in conjunction with the accompanying drawings, in which.

DESCRIPTION OF THE PRIOR ART

Figure 1:
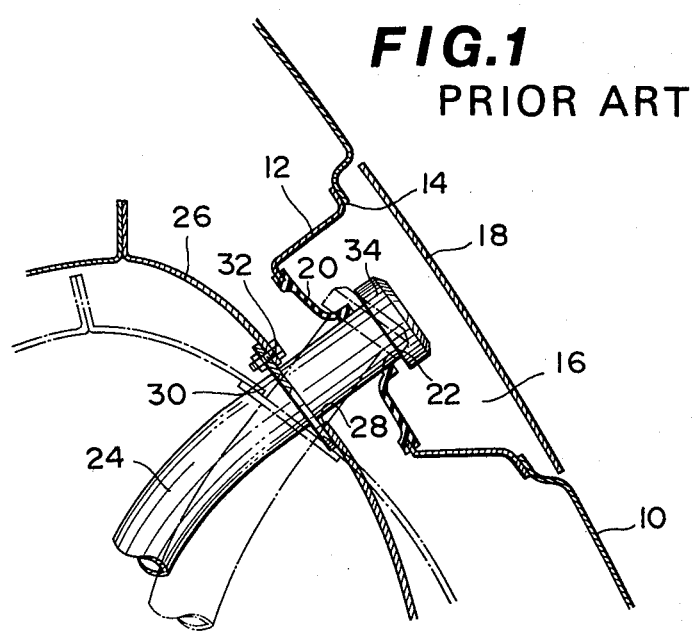
FIG. 1 is a sectional view of a conventional fuel filler structure.

Prior to describing the invention, one of the conventional fuel filler structures of a motor vehicle will be outlined with reference to FIG. 1 in order to clarify the invention.

Referring to FIG. 1, there is shown a conventional fuel filler structure which is installed inside, for example, of a rear fender panel 10 of a motor vehicle.

The fuel filler structure comprises a cup-shaped base member 12 which is welded at its peripheral edge to the fender panel 10 in a manner to cover an opening 14 formed in the panel 10. With this, a recess 16 is provided at the fender panel 10, which is closable by a lid 18 hinged to the panel 10. The base member 12 is formed at its bottom with an opening (no numeral) which is covered by a rubber sealing 20. The rubber sealing 20 has an opening 22 for sealingly holding a head portion of a fuel filler tube 24. For the reason which will be described hereinafter, there is no rigid connection between the cup-shaped base member 12 and the head portion of the filler tube 24, that is, the head portion is just supported by the base member 12 through the rubber sealing 20, so that the head portion of the tube 24 is movable, but slightly, relative to the base member 12 when pressed. Designated by numeral 26 is an inside constructional member of the vehicle, such as an outer panel of the wheel housing, which is usually spaced from the fender panel 10 as shown. The inside member 26 is formed with an opening 28 at a portion facing the opening 22 of the rubber sealing 20. Although not shown in the drawing, the fuel filler tube 24 leads to a fuel tank mounted in the vehicle body. The filler tube 24 is passed through the opening 28 with the head portion thereof supported by the rubber sealing 20. A flange 30 welded to the neck portion of the filler tube 24 is secured by bolts and nuts 32 to the inside member 26 to establish a rigid connection of the filler tube 24 to the inside member 26. A filler cap 34 is removably fitted to the mouth of the filler tube 24.

The reason why the head portion of the filler tube 24 is not secured to the base member 12 is to suppress generation of stress in the tube 24. That is, if a rigid connection is made between the tube 24 and the base member 12 in addition to that between the tube 24 and the inside member 26, a considerable stress is generated in the tube 24, as it is very difficult, during mass production, to ensure the alignment of the openings formed in the base member 12 and the inside member 26 respectively, so that if the tube 24 were to be fixedly connected to both of them, a considerable stress would almost certainly be produced in the tube.

In the above-mentioned conventional fuel filler structure, however, it may happen, upon a vehicle collision, that the filler cap 34 on the filler tube 24 hits against the base member 12 because of displacement of the inside member 26 relative to the outer panel 10, as is depicted by phantom lines. Thus, in the worst case, the filler cap 34 may be removed off from the tube 24, so that the fuel in the fuel tank runs out of the fuel tube 24. Obviously, this is quite dangerous because of high possibility of fire of the vehicle. One measure for solving this problem is to keep the wall of the base member 12 apart from the filler cap 34 as far as possible. However, this measure causes bulky, high-cost and unbalanced construction of the fuel filler structure.

DESCRIPTION OF THE INVENTION

Therefore, to solve the above-mentioned problem and drawback is an essential object of the present invention.

As will become apparent as the description proceeds, in the present invention, a unique measure is employed in which upon a vehicle collision inducing relative displacement between the head portion of the filler tube 24 and the base member 12, a projected bumper means formed on the head portion makes an initial collision against the base member thereby to prevent the collision of the filler cap with the base member.

In the following, a first embodiment of the present invention will be described with reference to FIGS. 2 and 3.

Figure 2:
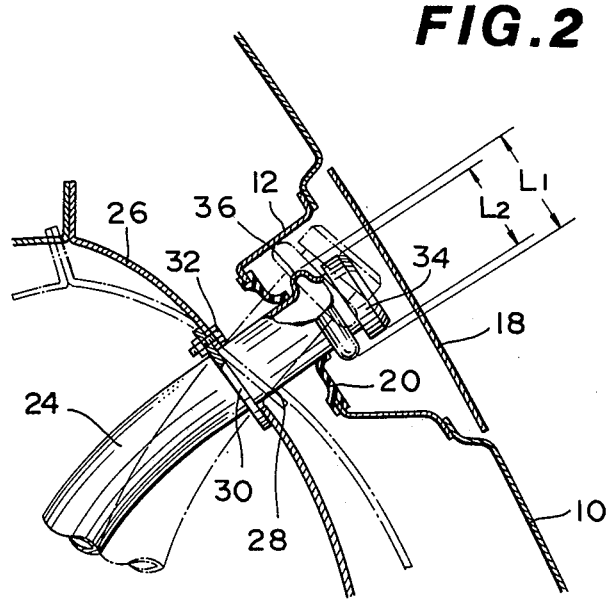
FIG. 2 is a sectional view of a fuel filler structure of a first embodiment of the present invention.
Figure 3:
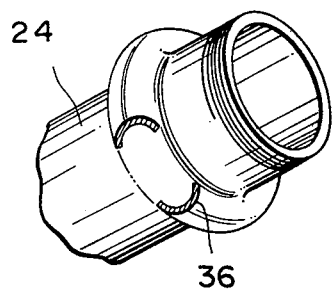
FIG. 3 is an enlarged perspective view of an essential portion of the fuel filler structure of the first embodiment.

Referring to these drawings, especially FIG. 2, there is shown a fuel filler structure of the first embodiment. In these drawings, similar parts to those in FIG. 1 are designated by the same numerals, and for ease with which the desdription is made, the detailed explanation of such similar parts is omitted from the following.

As may be apparent when comparing FIG. 2 with FIG. 1, in the first embodiment of FIG. 2, an annular outward projection or radial flange 36 is formed integrally on the filler tube 24 in the vicinity of the fuel inlet mouth of the tube, that is, near the filler cap 34. The outer diameter $L_1$ of the annular projection 36 is greater than the outer diameter $L_2$ of the filler cap 34. If desired, such annular projection may be a separate member welded to the filler tube 24, as shown in FIG. 3.

Upon a vehicle collision inducing the displacement of the filler tube 24, the annular projection 36 collides against the wall of the base member 12 at an initial stage thereby suppressing collision of the filler cap 34 with the base member 12. This will be understood from the displaced position of the structure indicated by phantom lines in FIG. 2. Thus, the filler cap 34 is prevented from being removed off from the filler tube 24 even when a considerable relative displacement is induced between the filler tube 24 and the base member 12.

Figure 4:
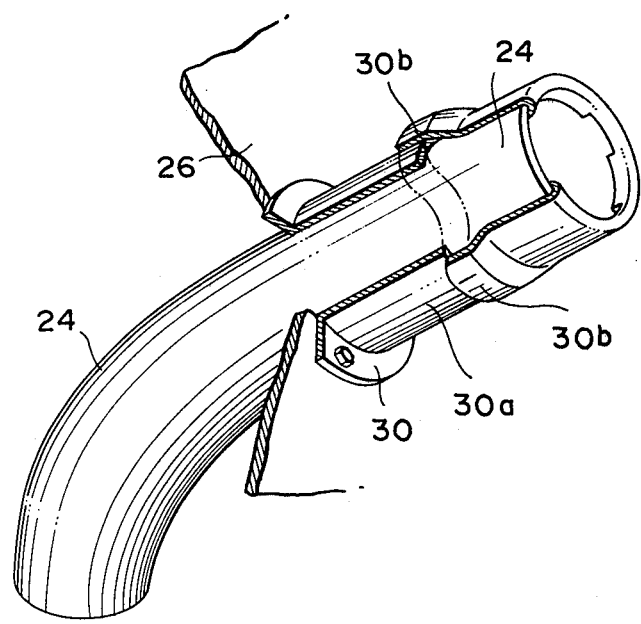
FIG. 4 is a partially cutaway perspective view of a fuel filler structure of a second embodiment of the present invention.
Figure 4A:
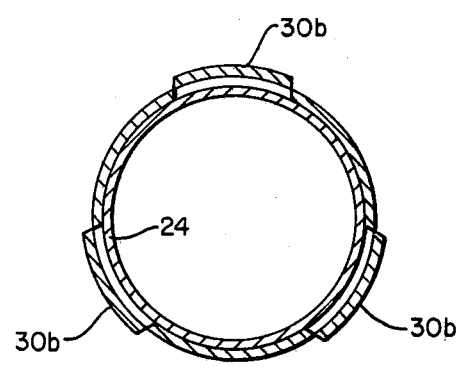
FIG. 4a is a bottom view of the tubular member shown in FIG. 4.

Referring to FIG. 4, there is shown a second embodiment of the present invention. In this embodiment, the flange 30 by which the filler tube 24 is tightly secured to the inside member 26 has a tubular section 30a which covers the head portion of the filler tube 24. The tubular section 30a has three equally spaced outward projections 30b thereabout. These projections 30b may be formed by making axially extending parallel slits about the tubular section 30a and then raising up the strip portions lying between any adjacent two of the slits. Each projection 30b is so sized as to make an initial collision against the base member 12 for preventing the collision between the filler cap 34 and the base member 12. Of course, as a substitute for the above-mentioned spaced projections 30b, an annular projection or radial flange formed on the tubular section 30a may be employed. In this case, the outer diameter of the annular projection is greater than that of the filler cap 34.

Figure 5:
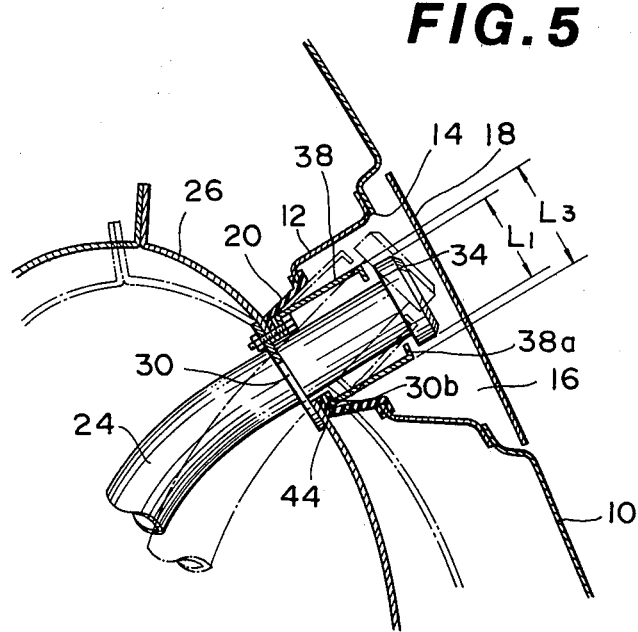
FIG. 5 is a sectional view of a fuel filler structure of a third embodiment of the present invention.
Figure 6:
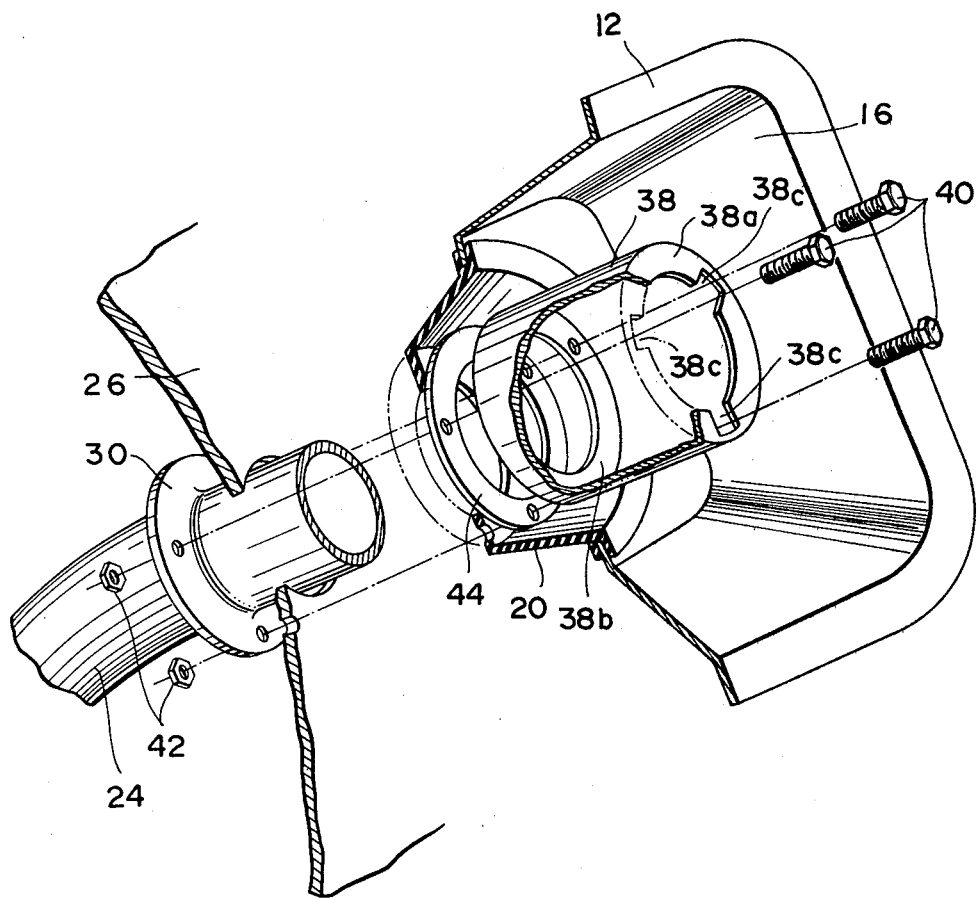
FIG. 6 is a partially cutaway exploded view of the fuel filler structure of the third embodiment.

Referring to FIGS. 5 and 6, there is shown a third embodiment of the present invention. As will be understood from FIG. 6, a tubular member 38 is coaxially and spacedly mounted about the head portion of the filler tube 24. The outer diameter $L_3$ of the tubular member 38 is greater than the outer diameter $L_1$ of the filler cap 34. In order to achieve the spaced mounting of the tubular member 38 relative to the filler tube 24, the tubular member 38 has at its both ends coaxial inward flanges 38a and 38b which act as spacers having the cylindrical major portion of the tubular member coaxially spaced from the filler tube 24. As is understood from FIG. 5, mounting the tubular member 38 to the filler tube 24 is so made that the fuel inlet mouth portion of the filler tube 24 is projected sufficiently from the flange 38a for achieving easy fitting of the filler cap 34 to the mouth of the filler tube 24. As is seen from FIG. 6, the tubular member 38 is secured at the flange 38b to the flange 30 of the filler tube 24 by means of bolts 40 and nuts 42. The three bolts 40 are passed through holes (no numerals) formed in the flange 38b, holes (no numerals) formed in a retainer ring 44, holes (no numerals) formed in the bottom of a cup-shaped rubber sealing 20, holes (no numerals) formed in the inside member 26 of the vehicle, and holes (no numerals) formed in the flange 30 of the filler tube 24 and engaged with the corresponding nuts 42 for achieving the securing of the tubular member 38 to the flange 30. Unlike the aforementioned first and second embodiments, the rubber sealing 20 has the cup-shaped construction and the bottom portion of it is secured to the inside member 26 of the vehicle. The flange 38a of the tubular member 38 has equally spaced cuts 38c for facilitating insertion of the bolts 40.

Thus, upon a vehicle collision inducing displacement of the filler tube 24 as indicated by phantom lines in FIG. 5, the tubular member 38 is brought into contact with the wall of the base member 12 at an initial stage thereby suppressing collision of the filler cap 34 with the base member 12. Thus, the filler cap 34 is prevented from being removed off from the filler tube 24 even upon a vehicle collision.

Figure 7:
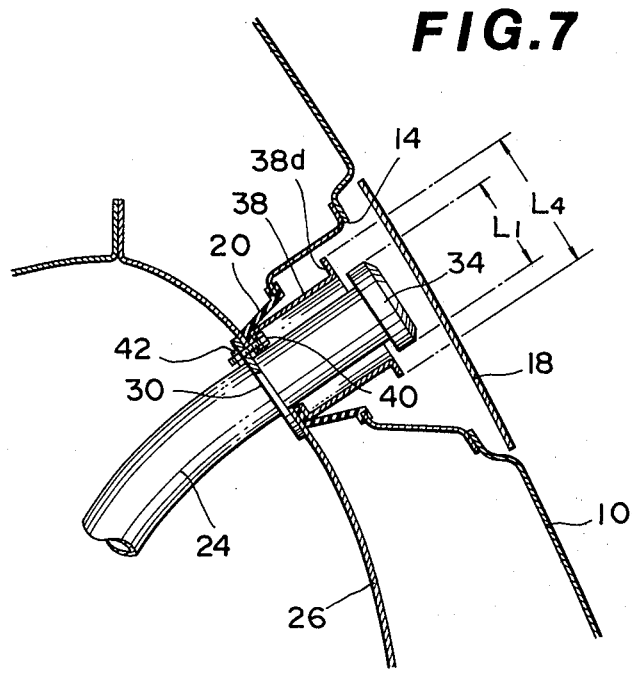
FIG. 7 is a sectional view of a fuel filler structure of a fourth embodiment of the present invention.

Referring to FIG. 7 of the drawings, there is shown a fourth embodiment of the present invention which is a slight modification of the third embodiment of FIGS. 5 and 6. In the fourth embodiment, the flange 38d corresponding to the flange 38a of the third embodiment projects radially outwardly, as shown, and securing the tubular member 38 to the flange 30 of the filler tube 24 is made without a retainer ring corresponding to the ring 44 of the third embodiment. The outer diameter $L_4$ of the flange 38d is greater than the diameter $L_1$ of the filler cap 34. Upon the displacement, the flange 38d makes the initial collision with the base member 12. By the provision of the outwardly projected flange 38d, not only the filler cap come-off phenomenon at the vehicle collision is suppressed, but also the mechanical strength of the tubular member 38 is increased.

As is understood from the foregoing description, in the present invention, a so-called bumper means is provided on the fuel inlet mouth portion of the filler tube and is sized to make an initial collision with the base member upon a vehicle collision. Thus, the undesired collision of the filler cap with the base member, which may induce the come-off of the filler cap from the filler tube, is prevented even at the vehicle collision. In addition, in the present invention, compact construction of the fuel filler structure is achieved because of positive employment of an arrangement in which the bumper means is contactable with the base member.

What is claimed is:

1. A fuel filler structure of a motor vehicle having an outer body panel and an inner structural panel spaced from said outer body panel, said fuel filler structure comprising:

a cup-shaped base member secured to an open portion of said outer body panel to form a recess on said outer body panel, said base member being formed at its bottom portion with an opening;

a fuel filler tube secured to said inner structural panel with its fuel inlet mouth portion freely inserted into said recess through said opening of said base member;

a flexible sealing member sealingly covering the clearance defined between said filler tube and said base member;

a filler cap removably fitted to the mouth of said filler tube and located within said recess of said outer body panel; and a bumper means mounted on said filler tube and constructed to make an initial collision with said base member when said fuel filler tube is displaced to a certain degree relative to said base member, wherein said bumper means comprises a tubular member which is spacedly and coaxially mounted about the fuel filler tube in the vicinity of the mouth of said filler tube, said tubular member being secured at its axial one end to a flange integrally formed on said fuel filler tube, said flange being secured to said inner structural panel, said tubular member having at its axial both ends respective inward flanges which act as spacers having the cylindrical major portion of said tubular member coaxially spaced from the filler tube, the diameter of said major portion being greater than the outer diameter of the filler cap which is circular.

2. A fuel filler structure of a motor vehicle having an outer body panel and an inner structural panel spaced from said outer body panel, comprising:

a cup-shaped base member secured in an opening formed in said outer body panel and arranged to extend toward said inner structural panel, said cup-shaped base member having an aperture formed at the bottom portion thereof;

a fuel filler tube disposed through and fixedly secured to said inner structural panel, said fuel filler tube extending through said aperture of said cup-shaped base member;

a flexible sealing member disposed in said aperture for sealing the clearance defined between said aperture and said fuel filler tube;

a filler cap removably disposed on the end of said fuel filler tube located in said cup-shaped base member; and a bumper member fixedly disposed on said fuel filler tube at a position between said aperture and said end of said fuel filler tube, said bumper member extending radially outwardly beyond said filler cap disposed on the end of said fuel filler tube, so that said filler cap is prevented from colliding with said cup-shaped base member upon flexure of said filler tube, said bumper member including a tubular member which is coaxially mounted at one end thereof about said fuel filler tube in the vicinity of said end of said fuel filler tube, said tubular member being formed with a plurality of outward projections each projecting radially outwardly beyond said filler cap at the other end of said bumper member opposite said one end.

3. A fuel filler structure as claimed in claim 2, in which said tubular member is formed at its one end with a flange which is tightly disposed about said filler tube to connect said filler tube to said inner structural panel.

4. A fuel filler structure of a motor vehicle having an outer body panel and an inner structural panel spaced from said outer body panel, comprising:

a cup-shaped base member secured in an opening formed in said outer body panel and arranged to extend toward the inner structural panel, said cup-shaped base member having an aperture formed at the bottom portion thereof;

a fuel filler tube disposed through and fixedly secured to said inner structural panel, said fuel filler tube extending through said aperture of said cup-shaped base member;

a flexible sealing member disposed in said aperture for sealing the clearance defined between said aperture and said fuel filler tube;

a filler cap removably disposed on the end of said fuel filler tube located in said cup-shaped base member; and a bumper member fixedly disposed on said fuel filler tube and having at least a portion which extends radially outwardly beyond said filler cap disposed on the end of said fuel filler tube, so that said filler is prevented from colliding with the cup-shaped base member upon flexure of said filler tube, said bumper member including a tubular member which is spacedly and coaxially mounted about the fuel filler tube in the vicinity of said end of the fuel filler tube, said tubular member being secured at its axial one end to a flange integrally formed on said fuel filler tube, said flange being secured to said inner structural panel.

5. A fuel filler structure as claimed in claim 4, in which said tubular member has at its axial both ends respective inward flanges which act as spacers having the cylindrical major portion of said tubular member coaxially spaced from the filler tube, the diameter of the major portion being greater thatn the outer diameter of the filler cap which is circular.

6. A fuel filler structure as claimed in claim 4, in which said tubular member has at its axial one end near said end of said filler tube a radially outward flange of which outer diameter is greater than the outer diameter of said filler cap which is circular.

* * * * *